(12) United States Patent
Watson

(10) Patent No.: US 10,801,189 B2
(45) Date of Patent: *Oct. 13, 2020

(54) SCREEN INTAKE DEVICE FOR SHALLOW WATER

(71) Applicant: Aqseptence Group, Inc., New Brighton, MN (US)

(72) Inventor: Mark Watson, Sturbridge, MA (US)

(73) Assignee: Aqseptence Group, Inc., New Brighton, MN (US)

(\*) Notice: Subject to any disclaimer, the term of this patent is extended or adjusted under 35 U.S.C. 154(b) by 905 days.

This patent is subject to a terminal disclaimer.

(21) Appl. No.: 14/510,826

(22) Filed: Oct. 9, 2014

(65) Prior Publication Data

US 2015/0021249 A1 Jan. 22, 2015

Related U.S. Application Data

(63) Continuation of application No. 13/658,716, filed on Oct. 23, 2012, now abandoned, which is a
(Continued)

(51) Int. Cl.
*E03B 3/04* (2006.01)
*E02B 5/08* (2006.01)

(52) U.S. Cl.
CPC .............. *E03B 3/04* (2013.01); *E02B 5/08* (2013.01); *Y10T 29/49826* (2015.01)

(58) Field of Classification Search
None
See application file for complete search history.

(56) References Cited

U.S. PATENT DOCUMENTS 154,158 A 8/1874 Spooner
423,129 A 3/1890 Clark
(Continued)

FOREIGN PATENT DOCUMENTS

CH 677947 A5 7/1991
JP 46-016455 6/1971
(Continued)

OTHER PUBLICATIONS

European Patent Office, European Examination Report dated Sep. 18, 2015, for European Patent Application No. 11250905.4-160B, 5 pages.
(Continued)

*Primary Examiner* — Robert J Popovics
(74) *Attorney, Agent, or Firm* — Patterson Thuente Pedersen, P.A.

(57) ABSTRACT

A screen intake apparatus has a concrete platform resting on a water source floor. A screen intake anchors on the platform and forms a half cylinder thereon. A barrier at one end of the platform in divides the flow of water. The screen intake has a half-cylindrical body and half-cylindrical screens. Transition walls in the screen intake divide the body's hollow and the screens' interiors, and at least one flow modifier communicates the interior with the hollow. These flow modifiers also form a half cylinder with the platform. A manifold in the screens receives a supply of air to clear debris. Forming a half-cylinder, the screen intake on the platform can have a much lower profile for the water source than the normal cylindrical screens, which require half of its diameter in clearance above and below.

19 Claims, 5 Drawing Sheets

Related U.S. Application Data continuation of application No. 12/951,217, filed on Nov. 22, 2010, now Pat. No. 8,297,448.

(56) References Cited

U.S. PATENT DOCUMENTS

| | | | |
|---|---|---|---|
| 539,800 A | 5/1895 | Durant | |
| 615,847 A | 12/1898 | Hansen | |
| 704,012 A | 7/1902 | Emerson | |
| 705,364 A * | 7/1902 | Kurtz | C02F 3/327 |
| | | | 210/170.01 |
| 756,517 A | 4/1904 | Miller | |
| 785,125 A * | 3/1905 | Shafer | B01D 21/245 |
| | | | 210/241 |
| 857,519 A * | 6/1907 | Foster | F16L 55/24 |
| | | | 210/460 |
| 866,560 A * | 9/1907 | Basye | E21B 43/088 |
| | | | 166/231 |
| 882,098 A | 3/1908 | Chial | |
| 894,339 A | 7/1908 | Niemeier | |
| 901,733 A | 10/1908 | O'Sullivan | |
| 1,033,745 A | 7/1912 | Smith | |
| 1,116,234 A | 11/1914 | Brown | |
| 1,209,800 A | 12/1916 | Barber | |
| 1,230,971 A | 6/1917 | Wilson | |
| 1,274,121 A | 7/1918 | White | |
| 1,315,615 A | 9/1919 | Wahlman | |
| 1,329,171 A | 1/1920 | Garry | |
| 1,579,917 A * | 4/1926 | Deming | F04B 53/1037 |
| | | | 210/242.1 |
| 1,694,743 A | 12/1928 | Hinman | |
| 1,810,981 A * | 6/1931 | Noble | B01D 29/11 |
| | | | 405/127 |
| 1,905,919 A * | 4/1933 | Kent | E02B 13/00 |
| | | | 210/460 |
| 1,945,824 A | 2/1934 | Saxe | |
| 1,967,785 A | 7/1934 | Schacht | |
| 2,249,020 A * | 7/1941 | McFarlin | F04B 53/1037 |
| | | | 210/460 |
| 2,270,116 A | 1/1942 | Featherston | |
| 2,300,952 A | 11/1942 | May | |
| 2,371,895 A | 3/1945 | Kingman | |
| 2,374,756 A | 5/1945 | Kisch et al. | |
| 2,490,443 A * | 12/1949 | Knipper | B01D 35/02 |
| | | | 210/315 |
| 2,503,455 A * | 4/1950 | Sheren | A62C 33/00 |
| | | | 210/318 |
| 2,512,877 A | 6/1950 | Rike | |
| 2,572,173 A | 10/1951 | McFarlin | |
| 2,580,209 A | 12/1951 | Wiley | |
| 2,597,728 A | 5/1952 | Hink | |
| 2,754,003 A * | 7/1956 | Fenner | D06F 39/10 |
| | | | 210/134 |
| 2,756,960 A | 7/1956 | Church | |
| 2,877,903 A | 3/1959 | Veres | |
| 2,886,181 A | 5/1959 | Wiedorn | |
| 2,957,579 A * | 10/1960 | McCombie | F04D 29/708 |
| | | | 210/242.1 |
| 3,037,636 A * | 6/1962 | McFarlin | F04B 53/1037 |
| | | | 210/429 |
| 3,109,812 A | 11/1963 | McAulay et al. | |
| 3,117,584 A | 1/1964 | Elenbaas | |
| 3,163,229 A | 12/1964 | Salisbury | |
| 3,206,036 A | 9/1965 | Hawley | |
| 3,291,313 A * | 12/1966 | Davis | F04D 29/708 |
| | | | 210/354 |
| 3,323,536 A | 6/1967 | O'Connor | |
| 3,495,714 A | 2/1970 | Barton | |
| 3,556,301 A | 1/1971 | Smith | |
| 3,556,406 A | 1/1971 | King | |
| 3,561,605 A * | 2/1971 | Likness | B01D 29/111 |
| | | | 210/497.1 |
| 3,613,894 A | 10/1971 | Clegg, Jr. | |
| 3,643,802 A * | 2/1972 | Jackson, Jr. | B63B 13/00 |
| | | | 210/172.3 |
| 3,722,686 A | 3/1973 | Arnett et al. | |
| 3,782,552 A | 1/1974 | Wendell | |
| 3,783,888 A | 1/1974 | Johnson | |
| 3,927,534 A * | 12/1975 | Larson | E02B 1/006 |
| | | | 405/127 |
| 4,017,394 A * | 4/1977 | Hensley | B01D 33/073 |
| | | | 210/157 |
| 4,149,689 A | 4/1979 | McDonald et al. | |
| 4,152,264 A * | 5/1979 | Hanna, Sr. | B01D 21/0012 |
| | | | 210/170.09 |
| 4,169,792 A * | 10/1979 | Dovel | B01D 33/073 |
| | | | 210/793 |
| 4,179,379 A | 12/1979 | Mitchell | |
| 4,210,539 A * | 7/1980 | Shiban | B01D 33/067 |
| | | | 210/391 |
| 4,245,924 A * | 1/1981 | Fouss | B29C 65/02 |
| | | | 405/45 |
| 4,260,286 A | 4/1981 | Buchanan | |
| 4,261,822 A * | 4/1981 | Richardson | B01D 33/073 |
| | | | 210/107 |
| D262,630 S * | 1/1982 | Logan, Jr. | 175/331 |
| 4,357,238 A | 11/1982 | Ziaylek | |
| 4,437,431 A | 3/1984 | Koch | |
| 4,594,024 A | 6/1986 | Jenkner et al. | |
| 4,647,374 A | 3/1987 | Ziaylek et al. | |
| 4,743,370 A * | 5/1988 | Mizusawa | B01D 29/111 |
| | | | 210/460 |
| 4,822,486 A * | 4/1989 | Wilkins | B01D 33/067 |
| | | | 210/170.09 |
| 4,834,138 A | 5/1989 | Dellasso | |
| 4,874,510 A * | 10/1989 | Akira | B01D 29/15 |
| | | | 210/172.4 |
| 4,973,403 A * | 11/1990 | Kozey | F04D 29/708 |
| | | | 169/13 |
| 4,973,405 A * | 11/1990 | Kozey | B01D 29/33 |
| | | | 169/30 |
| 4,998,847 A * | 3/1991 | Thurber | E01F 5/005 |
| | | | 210/164 |
| 5,082,013 A * | 1/1992 | Scheib | A62C 35/20 |
| | | | 137/1 |
| 5,094,751 A * | 3/1992 | Ramsey | B01D 29/114 |
| | | | 210/408 |
| 5,102,537 A * | 4/1992 | Jones | E03F 7/06 |
| | | | 138/96 R |
| 5,116,490 A | 5/1992 | Fontenot et al. | |
| D327,693 S * | 7/1992 | Berry | D15/141 |
| 5,156,738 A * | 10/1992 | Maxson | B01D 24/22 |
| | | | 210/274 |
| 5,161,913 A * | 11/1992 | Boylan | E02B 8/085 |
| | | | 405/83 |
| 5,215,656 A | 6/1993 | Stoneburner et al. | |
| 5,269,338 A * | 12/1993 | Figas | A01K 63/006 |
| | | | 119/245 |
| 5,417,553 A | 5/1995 | Gibson et al. | |
| 5,431,816 A * | 7/1995 | Aldred | B01D 35/26 |
| | | | 210/416.3 |
| 5,496,468 A * | 3/1996 | Cormier | B01D 29/33 |
| | | | 210/172.3 |
| 5,509,437 A * | 4/1996 | Merrett | A62C 35/68 |
| | | | 137/15.02 |
| 5,525,222 A * | 6/1996 | Gleason | B01D 29/114 |
| | | | 210/170.01 |
| 5,558,462 A * | 9/1996 | O'Haver | A01K 79/02 |
| | | | 405/81 |
| 5,581,934 A * | 12/1996 | Arnold, Sr. | A01M 23/00 |
| | | | 210/162 |
| 5,618,426 A * | 4/1997 | Eischen | B01D 24/12 |
| | | | 210/541 |
| 5,650,073 A * | 7/1997 | Merrett | B01D 29/33 |
| | | | 137/236.1 |
| 5,653,874 A * | 8/1997 | Berry, III | B01D 29/05 |
| | | | 210/159 |
| 5,759,398 A * | 6/1998 | Kielbowicz | B01D 25/02 |
| | | | 210/416.1 |
| 5,759,399 A * | 6/1998 | Bilanin | B01D 29/111 |
| | | | 210/416.1 |

(56) References Cited

U.S. PATENT DOCUMENTS

| | | | | |
|---|---|---|---|---|
| 5,797,421 A * | 8/1998 | Merrett | ............... | A62C 35/68 |
| | | | | 137/236.1 |
| 5,820,751 A | 10/1998 | Faircloth | | |
| 5,851,087 A * | 12/1998 | Berry, III | ............... | B01D 29/15 |
| | | | | 405/127 |
| 5,851,385 A * | 12/1998 | Merrett | ............... | B01D 29/33 |
| | | | | 210/170.09 |
| 5,922,197 A * | 7/1999 | Sparks | ............... | E03F 7/00 |
| | | | | 210/232 |
| 5,958,234 A * | 9/1999 | Dwyer | ............... | G21C 19/307 |
| | | | | 210/315 |
| 5,979,478 A * | 11/1999 | Screptock | ............... | C02F 1/50 |
| | | | | 137/101.25 |
| 6,036,850 A | 3/2000 | Reynolds | | |
| 6,042,733 A * | 3/2000 | Tucker | ............... | E02B 3/023 |
| | | | | 210/747.5 |
| 6,051,131 A * | 4/2000 | Maxson | ............... | B01D 29/114 |
| | | | | 210/162 |
| 6,066,253 A * | 5/2000 | Idland | ............... | B01D 29/15 |
| | | | | 210/167.1 |
| 6,089,790 A * | 7/2000 | Berry, III | ............... | E03B 3/04 |
| | | | | 405/127 |
| 6,126,016 A * | 10/2000 | Graham | ............... | B07B 1/12 |
| | | | | 209/385 |
| 6,386,049 B1 * | 5/2002 | Schrumm | ............... | A62C 37/50 |
| | | | | 73/861.66 |
| 6,401,829 B1 * | 6/2002 | Newton | ............... | A62C 27/00 |
| | | | | 169/13 |
| 6,440,303 B2 * | 8/2002 | Spriegel | ............... | B01D 29/15 |
| | | | | 137/140 |
| 6,451,204 B1 | 9/2002 | Anderson | | |
| 6,488,846 B1 * | 12/2002 | Marangi | ............... | B01D 29/15 |
| | | | | 210/232 |
| 6,491,818 B2 * | 12/2002 | Dwyer | ............... | G21C 19/307 |
| | | | | 210/315 |
| 6,508,933 B2 * | 1/2003 | Wilkins | ............... | B01D 29/682 |
| | | | | 210/170.09 |
| 6,551,507 B2 | 4/2003 | Gosling | | |
| 6,598,384 B1 | 7/2003 | Adkins | | |
| 6,638,435 B2 * | 10/2003 | Loreno | ............... | B01D 35/027 |
| | | | | 210/117 |
| 6,660,170 B2 | 12/2003 | Dreyer et al. | | |
| 6,682,651 B1 * | 1/2004 | Toland | ............... | B01D 29/15 |
| | | | | 210/155 |
| 6,712,959 B2 * | 3/2004 | Ekholm | ............... | B01D 29/114 |
| | | | | 210/162 |
| 6,764,596 B2 * | 7/2004 | Tucker | ............... | E02B 3/023 |
| | | | | 210/162 |
| 6,863,807 B2 | 3/2005 | Crawford, III | | |
| 6,949,198 B2 * | 9/2005 | Reber | ............... | A62C 33/00 |
| | | | | 210/170.09 |
| 6,953,524 B2 | 10/2005 | Woodbridge et al. | | |
| 6,953,528 B2 * | 10/2005 | Nesfield | ............... | E02B 3/02 |
| | | | | 210/747.5 |
| 6,955,759 B2 * | 10/2005 | Patrick | ............... | A01K 79/02 |
| | | | | 210/162 |
| 7,025,878 B2 * | 4/2006 | Spriegel | ............... | B01D 29/15 |
| | | | | 210/232 |
| 7,201,842 B2 * | 4/2007 | Kiefer | ............... | B01D 29/085 |
| | | | | 210/162 |
| 7,222,638 B1 * | 5/2007 | Wong | ............... | E02B 3/10 |
| | | | | 137/544 |
| 7,273,545 B1 * | 9/2007 | Lloyd | ............... | A01K 63/045 |
| | | | | 210/162 |
| 7,347,933 B2 * | 3/2008 | Berry, III | ............... | B01D 33/461 |
| | | | | 210/158 |
| 7,430,929 B1 | 10/2008 | Vroblesky | | |
| 7,501,058 B1 * | 3/2009 | Lawrence, Sr. | ............... | B01D 29/33 |
| | | | | 210/232 |
| 7,575,677 B1 * | 8/2009 | Barnes | ............... | B01D 29/111 |
| | | | | 210/170.01 |
| 7,641,803 B2 | 1/2010 | Dreyer | | |
| 7,682,104 B2 * | 3/2010 | Wassman | ............... | E01F 5/005 |
| | | | | 210/166 |
| 7,713,031 B2 | 5/2010 | Dane | | |
| 7,776,222 B2 * | 8/2010 | Glessner | ............... | C02F 1/001 |
| | | | | 114/125 |
| 7,794,589 B2 * | 9/2010 | Kozey | ............... | B01D 35/05 |
| | | | | 210/122 |
| 7,850,857 B2 * | 12/2010 | Tucker | ............... | E02B 3/023 |
| | | | | 210/747.5 |
| 7,867,395 B2 * | 1/2011 | Ekholm | ............... | B01D 29/114 |
| | | | | 210/333.01 |
| 7,938,957 B2 | 5/2011 | Bolan et al. | | |
| 7,950,527 B2 * | 5/2011 | Osborne | ............... | B01D 29/114 |
| | | | | 210/483 |
| 8,075,700 B2 * | 12/2011 | Ekholm | ............... | B01D 29/114 |
| | | | | 134/22.12 |
| 8,083,939 B2 * | 12/2011 | Dowsett | ............... | B01D 29/96 |
| | | | | 210/232 |
| 8,123,957 B2 | 2/2012 | Bolan et al. | | |
| 8,192,622 B2 * | 6/2012 | Kozey | ............... | B01D 29/33 |
| | | | | 210/232 |
| 8,292,089 B2 * | 10/2012 | Osborne | ............... | B01D 29/114 |
| | | | | 210/460 |
| 8,297,448 B2 * | 10/2012 | Watson | ............... | E02B 5/08 |
| | | | | 210/170.09 |
| 8,505,154 B2 * | 8/2013 | Schuler | ............... | B01D 35/02 |
| | | | | 15/302 |
| 9,108,127 B2 * | 8/2015 | Schuler | ............... | B01D 35/02 |
| 9,255,372 B2 * | 2/2016 | Whitaker | ............... | E02B 5/085 |
| 9,399,858 B2 * | 7/2016 | Maxson | ............... | E03B 3/04 |
| 9,889,395 B2 * | 2/2018 | Reber | ............... | F04F 5/10 |
| 9,943,786 B2 * | 4/2018 | Ekholm | ............... | B01D 29/66 |
| 9,968,872 B2 * | 5/2018 | Carayon | ............... | B01D 33/801 |
| 10,124,279 B2 * | 11/2018 | Schuler | ............... | B01D 35/02 |
| 10,391,429 B2 * | 8/2019 | Carayon | ............... | B01D 33/801 |
| 10,399,013 B2 * | 9/2019 | Maxson | ............... | B01D 35/02 |
| 10,549,224 B2 * | 2/2020 | Carayon | ............... | B01D 33/503 |
| 2003/0029780 A1 * | 2/2003 | Ekholm | ............... | B01D 29/114 |
| | | | | 210/162 |
| 2003/0034286 A1 | 2/2003 | Butler | | |
| 2004/0057839 A1 | 3/2004 | Crawford, III | | |
| 2004/0164031 A1 * | 8/2004 | Reber | ............... | A62C 33/00 |
| | | | | 210/767 |
| 2004/0200766 A1 * | 10/2004 | Patrick | ............... | E02B 1/006 |
| | | | | 210/153 |
| 2005/0126967 A1 | 6/2005 | Berry et al. | | |
| 2005/0161380 A1 | 7/2005 | Crawford | | |
| 2006/0090440 A1 | 5/2006 | Gullickson | | |
| 2006/0289346 A1 * | 12/2006 | Kiefer | ............... | B01D 29/085 |
| | | | | 210/167.1 |
| 2007/0017549 A1 * | 1/2007 | Ekholm | ............... | B01D 29/661 |
| | | | | 134/10 |
| 2007/0090041 A1 | 4/2007 | Berry et al. | | |
| 2007/0175834 A1 * | 8/2007 | Osborne | ............... | B01D 29/114 |
| | | | | 210/767 |
| 2007/0267340 A1 * | 11/2007 | Bleigh | ............... | B01D 35/02 |
| | | | | 210/486 |
| 2008/0061010 A1 * | 3/2008 | Tom | ............... | A01K 63/045 |
| | | | | 210/767 |
| 2008/0230460 A1 * | 9/2008 | Dowsett | ............... | B01D 29/48 |
| | | | | 210/230 |
| 2008/0295758 A1 * | 12/2008 | Glessner | ............... | C02F 1/001 |
| | | | | 114/125 |
| 2011/0056526 A1 * | 3/2011 | Ekholm | ............... | B08B 9/00 |
| | | | | 134/37 |
| 2011/0233132 A1 * | 9/2011 | Wietharn | ............... | B01D 33/50 |
| | | | | 210/403 |
| 2011/0240543 A1 * | 10/2011 | Kozey | ............... | E03B 3/04 |
| | | | | 210/232 |
| 2011/0290743 A1 * | 12/2011 | Osborne | ............... | B01D 35/02 |
| | | | | 210/767 |
| 2012/0018369 A1 * | 1/2012 | Markgraf | ............... | B01D 29/48 |
| | | | | 210/435 |
| 2012/0125828 A1 * | 5/2012 | Watson | ............... | E02B 5/08 |
| | | | | 210/162 |
| 2013/0043172 A1 * | 2/2013 | Watson | ............... | E03B 3/04 |
| | | | | 210/162 |

(56) References Cited

U.S. PATENT DOCUMENTS

| | | | | |
|---|---|---|---|---|
| 2013/0048551 A1* | 2/2013 | Maxson | ................. | B01D 39/10 210/323.2 |
| 2013/0206706 A1* | 8/2013 | Ekholm | ................. | B01D 29/68 210/797 |
| 2014/0374340 A1* | 12/2014 | Whitaker | ................ | E02B 5/085 210/499 |
| 2015/0021249 A1* | 1/2015 | Watson | ..................... | E03B 3/04 210/153 |
| 2015/0306527 A1* | 10/2015 | Schuler | ................. | B01D 29/46 210/190 |
| 2017/0106313 A1* | 4/2017 | Maxson | ............... | B01D 29/114 |

FOREIGN PATENT DOCUMENTS

| | | |
|---|---|---|
| JP | 2000186317 | 7/2000 |
| JP | 2002525465 | 8/2002 |
| WO | WO 97/00110 | 1/1997 |
| WO | WO 00/19022 | 4/2000 |

OTHER PUBLICATIONS

PSNH Merrimack Station Publication; Oct. 2009; prepared by Enercon Services, Inc. 108 pages.

Technical Development Document for the Final Section 316(b) Phase III Rule; EPA; 283 pages; date unknown.

Screening at intakes and outfalls: measures to protect eel; UK Environment Agency; 129 pages; date unknown.

Fish Screen—downloaded from Wikipedia on Jun. 15, 2014; 4 pages.

Johnson Screens, Brochure, "Passive Intake Screen Systems," obtained from http://www.johnsonscreens.com, undated, 8 pages.

Johnson Screens, Brochure, "High Capacity Intake Screens," copyright 2010, 4 pages.

Jones & Stokes Assoc., "Evaluation Plan: USBR Flat Plate Screen at Coleman National Fish Hatchery Intake No. 3," dated Mar. 1999, pp. 5-8.

Canadian Patent Office, Canadian Patent Application No, 2,756,960 Office Action dated Jun. 5, 2013, pp. 1-2.

Australian Patent Office, Examiners First Report received in corresponding Australian Patent Application No. 2011247832 (205-0233AU), dated Oct. 12, 2012, 3 pages.

European Patent Office, European Patent Application No. 11250905.4 European Search Report dated Nov. 26, 2013, 6 pages.

Canadian Office Action for Application No. 2756960 dated Oct. 14, 2014.

Submission of prior art under section 34.1 of the Patent Act dated Nov. 3, 2016 for Canadian Application No. 2756960, 148 pages.

Japanese Office Action dated Jul. 10, 2015, for Japanese Patent Application P2013-167095.

Australian Examination Report dated Jun. 23, 2015, for Australian Patent Application No. 2014202078.

* cited by examiner

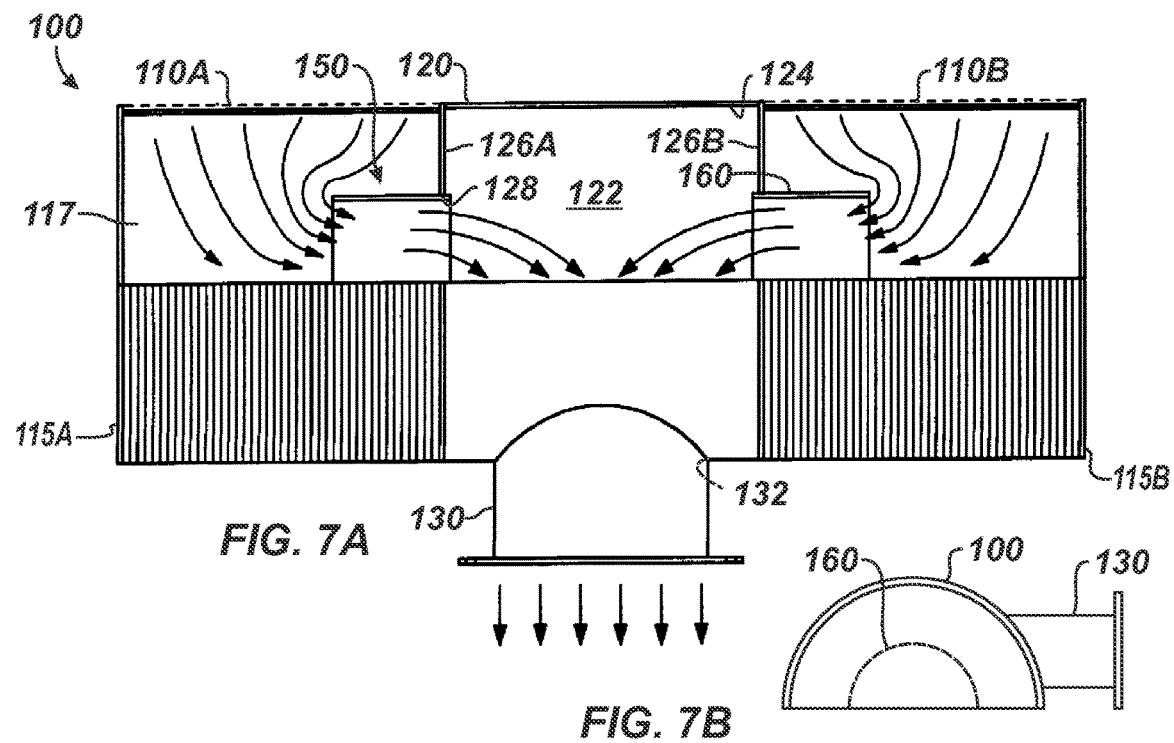
FIG. 7A
FIG. 7B
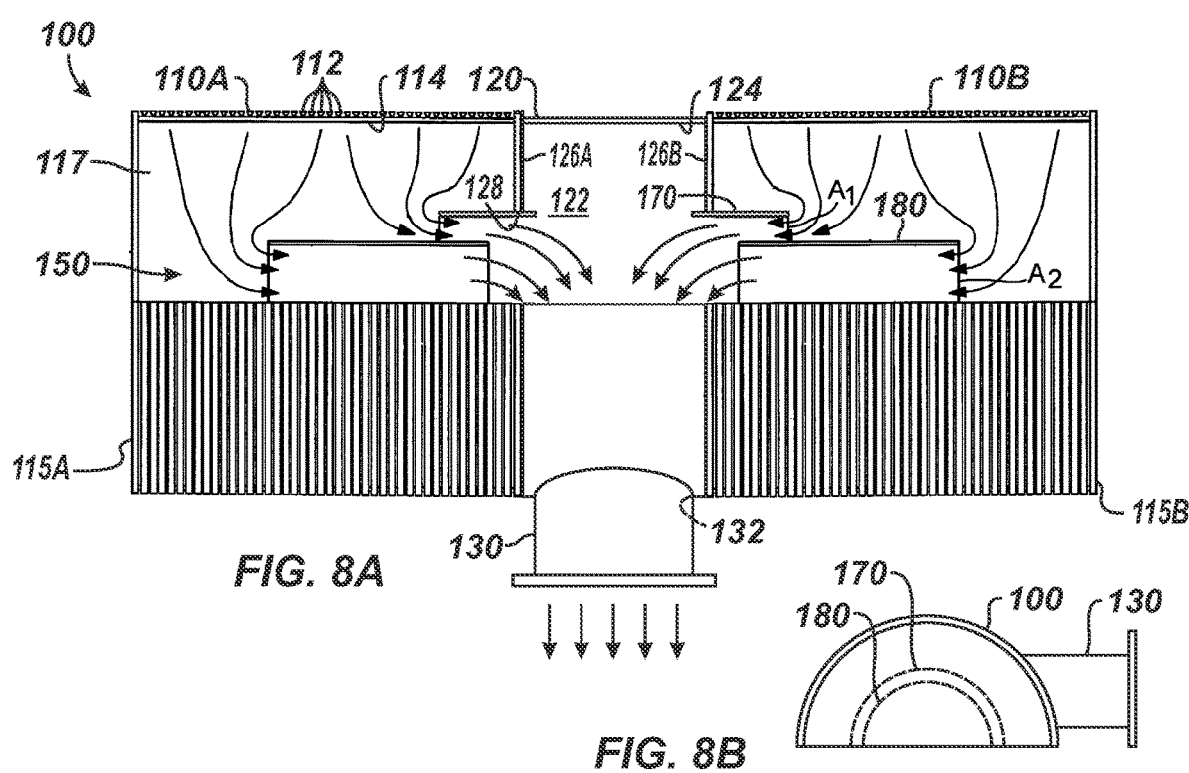
FIG. 8A
FIG. 8B

SCREEN INTAKE DEVICE FOR SHALLOW WATER

CROSS-REFERENCE TO RELATED APPLICATIONS

This is a continuation of U.S. patent application Ser. No. 13/658,716, filed Oct. 23, 2012, which is a continuation of U.S. patent application Ser. No. 12/951,217, filed Nov. 22, 2010, issued as U.S. Pat. No. 8,297,448, the contents of all of which are incorporated herein by reference in their entirety.

BACKGROUND

Drinking water plants, manufacturing plants, irrigation systems, and power generation facilities use large quantities of water for their operation. To collect the water, screen intakes are used in various bodies of water. As shown in FIG. 1A, one common type of screen intake 10 has a tee configuration with two screens 12A-B on opposing ends of a central body 14. An outlet 16 connects from the central body 14 for connecting to components of a screen intake system.

The screen intake 10 must be designed to protect aquatic life and to prevent buildup of debris along the length of the intake's screens 12A-B. To do this, the flow velocity through the screens should be kept below a maximum peak level, which may be about 0.5 f/s. One way to reduce the flow resistance and control the flow velocity evenly across the screen's surface is to use flow modifiers inside the screen intake. For example, Johnson Screens—the assignee of the present disclosure—improves flow uniformity using flow modifiers as disclosed in U.S. Pat. Nos. 6,051,131 and 6,712,959, which are incorporated herein by reference in their entireties.

When used in a source waterway, the screen intakes 10 must be arranged with no less than a minimum amount of distance surrounding it. As shown in FIG. 1B, the standard intake 10 requires clearance above and below the screen intake 10 that is at least half of the intake's diameter. For example, a screen intake 10 having a 24-in. diameter needs 12-in. clearance above and below the intake 10 for proper operation. Thus, the 24-in. diameter screen intake 10 can mount in water with a total minimum depth of 48-in. (4-ft.).

Available source waters for intake systems are becoming shallower. For shallow applications, flat screens, velocity caps, or cribbing has been used in the past to intake source water. These traditional approaches sit flat on the bottom of the source water. Being flat, however, these types of screens can have problems with deflection and strength when subjected to flow and debris. In addition, these types of screens can be difficult to keep clear of debris. Finally, flat screens can have uneven flow distribution over the screen's surface area, which can be problematic during operation.

The subject matter of the present disclosure is directed to overcoming, or at least reducing the effects of, one or more of the problems set forth above.

SUMMARY

A screen intake apparatus has a base that disposes on a floor of a water source. The base can be a concrete slab or platform resting on the floor and having a top surface. A screen intake disposes on the base and forms a half cylinder thereon. Anchors can affix edges of the screen intake to the top surface of the base. In a river or application with strong currents, the base would preferably have a barrier disposed at one end thereof in a path of flow of the source water to deflect debris and silt from the screen intake.

The screen intake has a body with first and second screens on its ends. Each of the screens forms a half cylinder on the base and defines an interior therein. The interiors communicate with the hollow of the body so the source water entering the screen passes to the body and out a common outlet.

The first and second screens each have a screen sidewall, a closed distal end, and an open proximal end. The open proximal end attaches to the body, while the closed distal ends have end walls that define a half circle. Preferably, the screen intake has transition walls disposed between the hollow of the body and the interiors of the screens. At least one flow modifier disposes in each of the transition walls. The flow modifier has one open end communicating with the interior of the screen and has another open end communicating with the hollow of the body. The flow modifier can have two or more flow modifiers nested inside one another, and these flow modifiers also form a half cylinder with the base.

The screen intake can also have a manifold disposed in the screens for receiving a supply of air used to clear the screens of debris. Construction of the screens can use ribs disposed along a length of the screen and can have wires disposed across the ribs. Overall, the half cylinder screen intake mounted on the top surface of the base can provide all the attributes of a normal intake screen but provide a very low profile for shallower applications.

The foregoing summary is not intended to summarize each potential embodiment or every aspect of the present disclosure.

BRIEF DESCRIPTION OF THE DRAWINGS

FIGS. 7A-7B show plan and end views of a screen intake with a first type of flow modifier.

FIGS. 8A-8B show plan and end views of a screen intake with a second type of flow modifier.

DETAILED DESCRIPTION

Figure 1A:
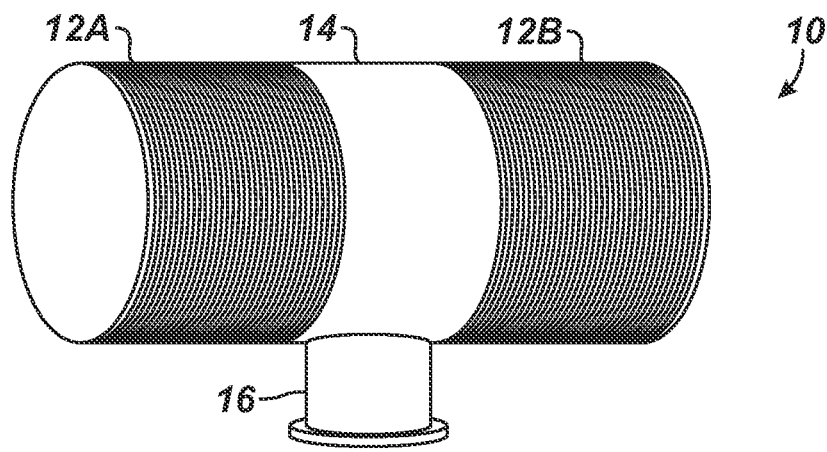
FIG. 1A is a perspective view of a screen intake according to the prior art.
Figure 1B:
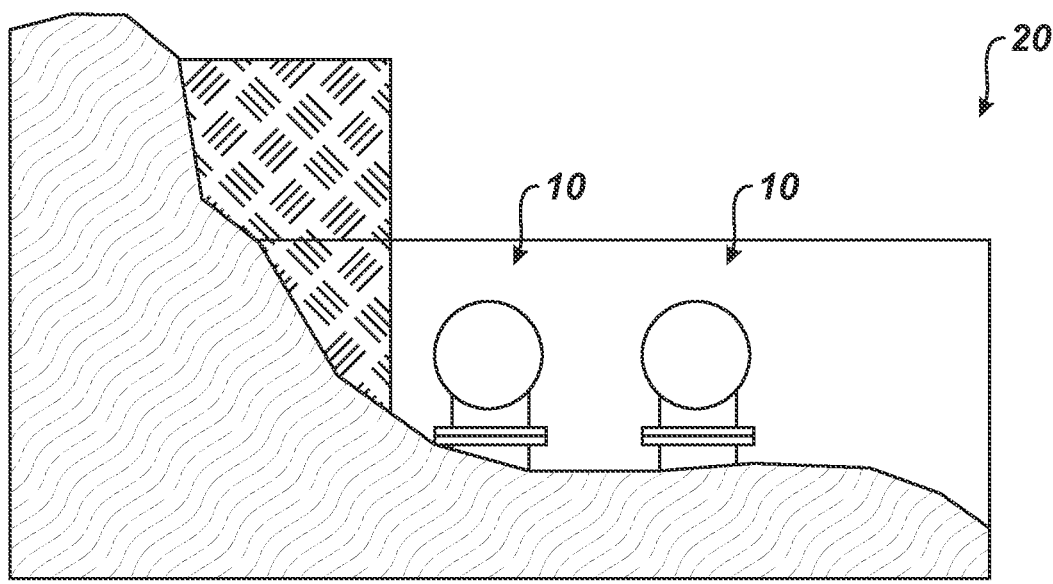
FIG. 1B is a view of a prior art screen intake system used in a shallow water source, such as a river.
Figure 2:
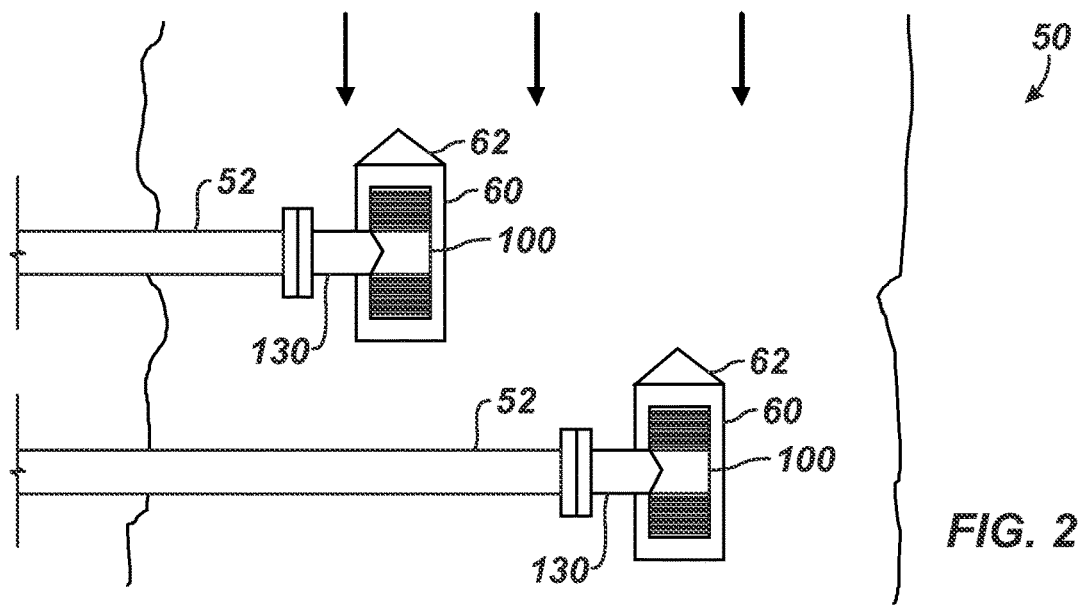
FIG. 2 is a plan view of a screen intake system according to the present disclosure.
Figure 3A:
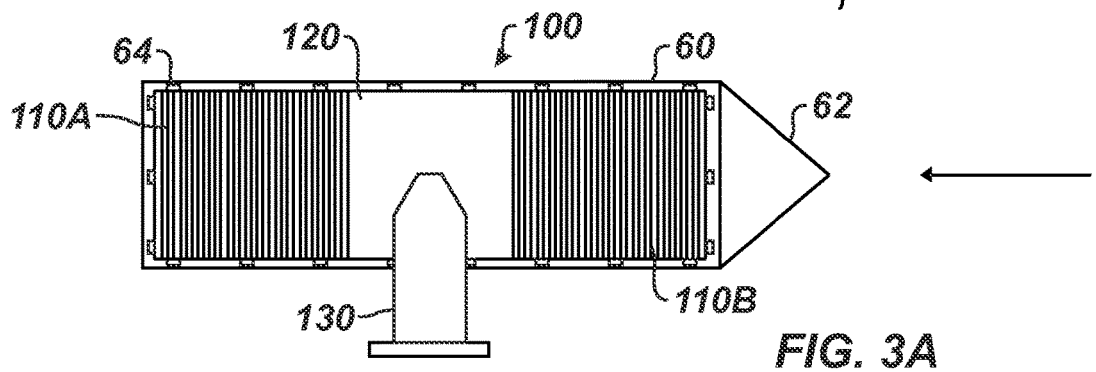
FIGS. 3A-3C show plan, side, and end views of a screen intake on a platform for the disclosed intake system.
Figure 3B:
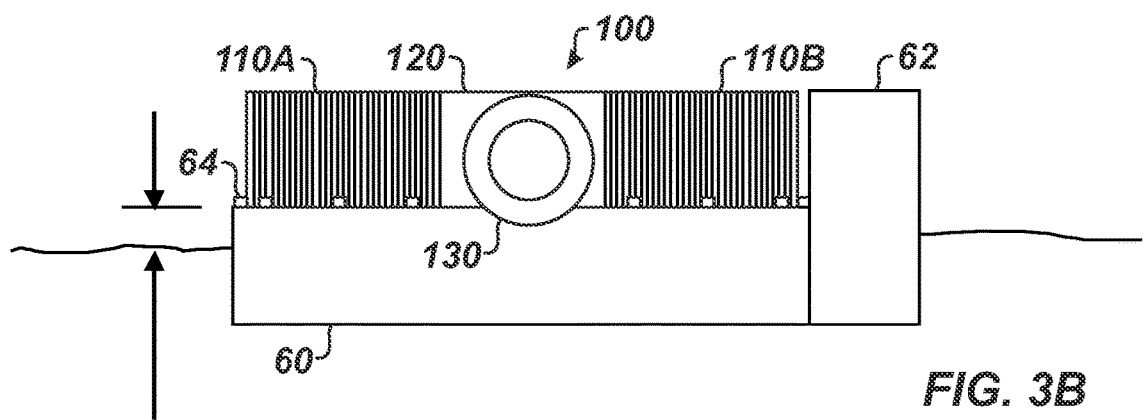

A screen intake system 50 in FIG. 2 has two screen intakes 100, although more or less could be used. Each screen intake 100 positions on a base or platform 60 disposed in the flow of a water source, such as a river. FIGS. 3A and 3B show top and side views of the platform 60. The platform 60 can be composed of a concrete slab or the like and can rest on the floor of the water source. As shown in FIG. 3B, the platform 60 preferably extends at least 3-4 inches above the floor of the water source.

In a river or other application where a current is present, the front end of each platform 60 has a profiled barrier 62 to cut the water flow ahead of the screen intake 100. The profiled barrier 62 is preferably angled at its front face and divides the passage of water, debris, and silt. In addition as shown in FIG. 3B, the profiled barrier 62 preferably extends to about the height of the screen intake 100 resting on the platform 60. The barrier 62 can be separately constructed from the platform 60 or can be integrally formed therewith. As an alternative to the barrier 62, the screen intake 100 can be provided with a profiled end.

As shown in FIG. 3A, the screen intake 100 can have a tee configuration with first and second screen sections 110A-B connected on opposing ends of a central body 120. End walls 115A-B close off the ends of the screen sections 110A-B, and a central outlet 130 extends from the central body 120. Alternatively, the screen intake 100 can have one screen section 110 connected to a body 120 with an outlet 130, while the other end of the body 120 is closed and lacks a second screen section 110.

Figure 3C:
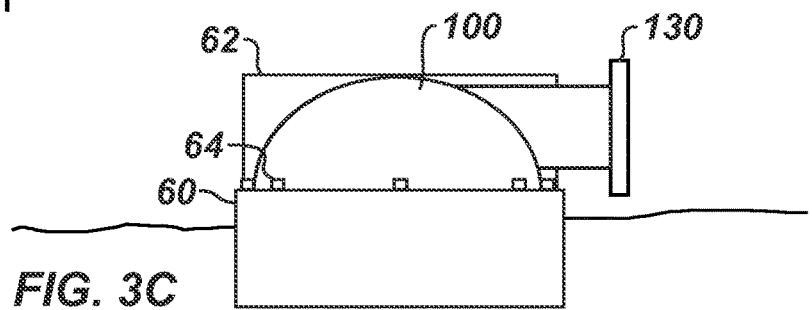

As shown in FIG. 3C, the screen intake 100 defines a half cylinder on the top surface of the platform 60. In general, the screen intake 100 has half-cylinder screens for the screen sections 110A-B along with half circle end walls 115A-B. The body 120 can have a half-cylinder sidewall, although another configuration could be used. Each of these components (110, 115, 120) can be affixed together using techniques known in the art. In one arrangement, the screen intake 100 has a flat bottom component that affixes to the edges of these interconnected components (110, 115, 120). Such a flat bottom can rest against the top surface of the platform 60, while anchor bolts 64 or the like are used to affix the screen intake 100 to the platform 60.

Alternatively, the intake 100 may lack an overall flat bottom component that affixes to the edges of the connected components (110, 115, 120). Instead, free edges of the interconnected body 120, screen sections 110A-B, and end walls 115A-B can fit directly against the platform 60 and can attach thereto using the anchor bolts 64 or the like. For example, the platform 60 can have a width and a length that is slightly larger than the screen intake 100 by about 3-in. or so. The platform 60 can have holes defined all around its perimeter for concrete anchor bolts 64 that hold the screen intake 100 onto the platform 60.

In yet another arrangement, the screen intake 100 can be a cylindrical (or at least partial cylindrical) screen intake partially embedded in the material of the platform 60. In this arrangement, the full or partial cylindrical screen intake 100 can be embedded in the concrete of the platform's slab when constructing the platform 60 using techniques available in the art.

In assembly, the screen intake 100 can be preconstructed on the platform 60 on land, and both components 60/100 can be sunk to the floor of the water source. Alternatively, the screen intake 100 and platform 60 can be separately constructed. The platform 60 can be placed on the water source's floor, and the screen intake 100 can be affixed to the top surface of the platform 60 with the anchors 64. These and other forms of construction can be used for the screen intake system 50.

As shown in FIG. 2, the outlets 130 of the screen intakes 100 connect by piping 52 to a facility (not shown) configured to use the intake water. Preferably, the intakes 100 and platforms 60 are staggered in relation to one another so as not to lie in each other's wakes. The screen intake 100 mounted toward the bottom of the source water reduces the depth needed to take in the same flow as a conventional screen. For example, the screen intake 100 can define a 24-in. diameter (12-in. radius). This requires a 12-in. clearance above the screen intake 100 for proper operation.

Figure 4A:
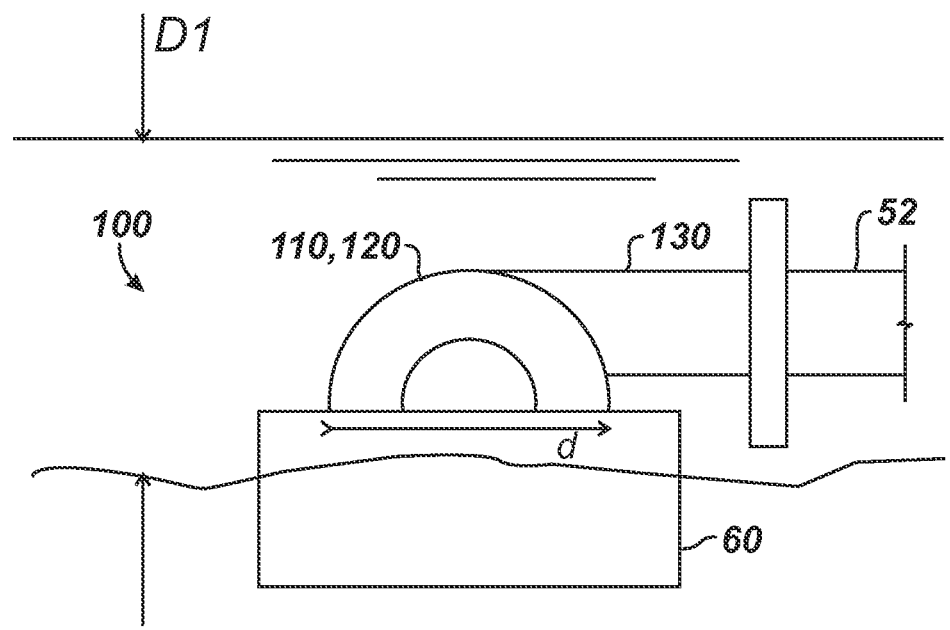
FIGS. 4A-4B show a 24-inch tee screen intake of the prior art compared to a 24-inch half-screen intake according to the present disclosure.
Figure 4B:
Figure 4B:
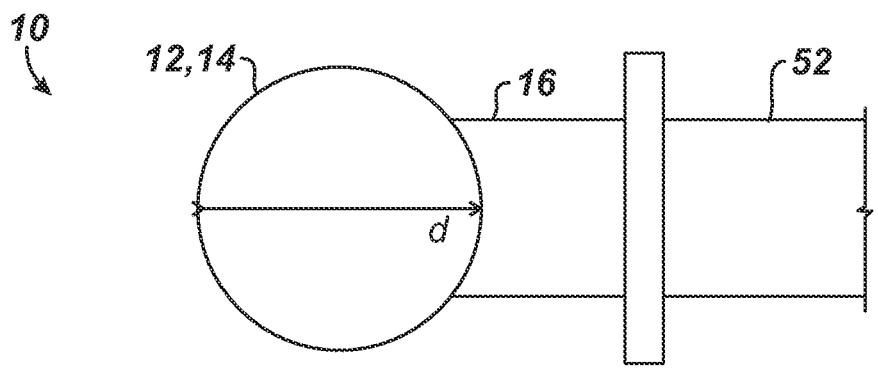

As shown in FIG. 4A, for example, the screen intake 100 of the present disclosure with a 24-in. diameter d can operate in a total minimum operational depth D1 of only about 20-in. This offers advantages over conventional systems using a 24-in. diameter tee screen 10 of the prior art as shown for comparison in FIG. 4B. Such a conventional tee screen 10 of the prior art needs a 48-in depth D2 of water.

As shown in FIGS. 3A-3B, each of the screen sections 110A-B defines a plurality of slots for entry of water into the screen sections 110A-B. The slots can be either transverse or parallel to the axis of the screen sections 110A-B. Preferably, spaced wraps of profiled wire form the slots of the screen sections 110A-B, although the screen sections 110A-B can also be a solid pipe member with slots formed therein. The screen sections 110A-B can keep flow distribution even over the screen's surface area. The curved, rounded screen sections 110A-B also provide strength to the screen intake 100 while offering a low profile. Thus, the curved screen sections 110A-B may not need additional structural support in their interiors to support the screen surfaces.

Figure 5:
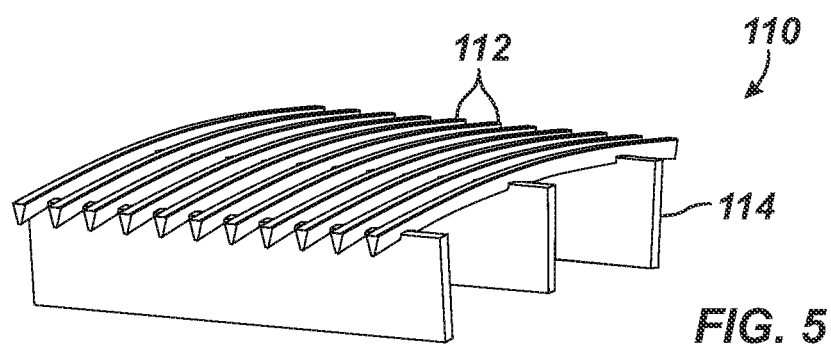
FIG. 5 shows a portion of a screen section for the screen intake of the present disclosure.

As shown in FIG. 5, one form of construction for the screen sections 110 has profiled wires 112 and support bars 114. In one implementation, the support bars 114 run along the length of the screen section 100, and the profiled wires 112 circumferentially wrap and weld to the support bars 114 to form the screen section 110 using techniques known in the art. The profiled wires 112 are preferably wedged or Vee-shaped with a wider base of the wire 112 facing outward to enhance the sliding of debris over the screens' surfaces. For example, the profiled wire 112 can be VEE-WIRE® available from Johnson Screens. (VEE-WIRE is a registered trademark of Weatherford/Lamb, Inc.).

Figure 6A:
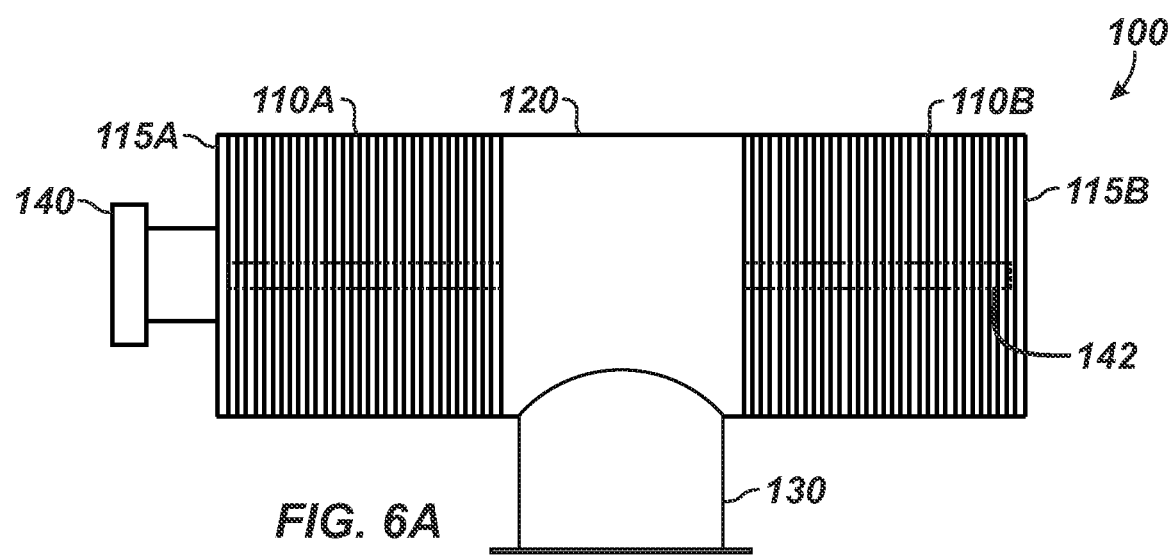
FIGS. 6A-6C show plan and end views of one type of screen intake for the disclosed system.
Figure 6B:
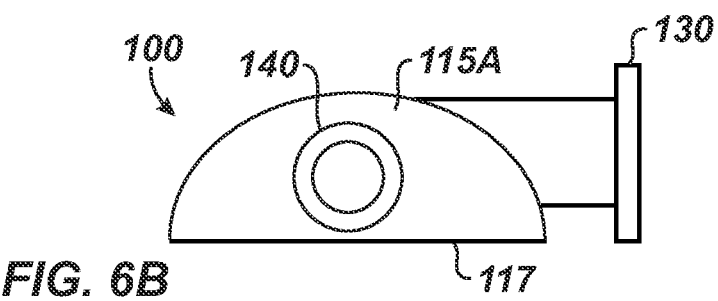
Figure 6C:
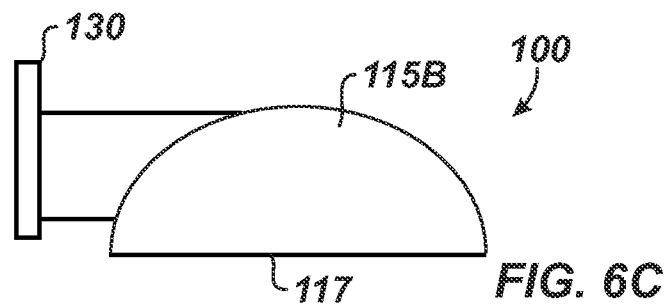

Another example of a screen intake 100 is shown in FIGS. 6A-6C. This intake 100 has the screen sections 110A-B, end walls 115A-B, central body 120, and outlet 130 as before. The intake 100 also defines a half cylinder as shown in FIG. 6B-6C. The screen intake 100 can have a closed or open bottom 117 as discussed previously for resting on the top surface of a platform.

In addition to these features, the screen intake 100 has an air backwash pipe 140 and a header 142 provided for backwashing the screen intake 100 with an air burst to clear debris. The air backwash header 142 connects to the air backwash pipe 140 and disposes inside the screen sections 110A-B and the body 120. When used, the pipe 140 and header 142 allow the screen intake 100 to be backwashed with an airburst to clear debris. These features can be based on Johnson Screen's Hydroburst System. In general, the Hydroburst system uses a compressor, a tank, valves, and controls to generate a blast of air in the screen sections 110A-B. Done periodically, the air blast flushes debris away from the screen's surfaces.

In addition to the backwash system, the intake 100 of the present disclosure can include flow modifiers disposed internally in the screen sections 110A-B. The flow modifiers can be used with the backwash system or alone. Further details of the flow modifiers are provided below with reference to FIGS. 7A-7B and 8A-8B.

The screen intake 100 illustrated in FIGS. 7A-7B and 8A-8B each has a tee configuration with first and second screens 110A-B connected on opposing ends of the central body 120. The central body 120 defines a hollow 122 therein and has a half-cylindrical sidewall 124 and opposing transition walls 126A-B. The outlet conduit 130 connects to an opening 132 in the sidewall 124 and has a flange for connecting to other components of a fluid intake system (not shown). Both transition walls 126A-B have a central opening 128 receiving flow from one of the screen sections 110A-B.

Both screen sections 110A-B have open ends connected to the body's transition walls 126A-B and have closed ends walls 115A-B that may or may not be shaped to deflect debris. Each of the screen sections 110A-B defines a half cylinder and defines a plurality of slots for entry of water into the screen sections 110A-B as described previously. Again, the slots can be either transverse or parallel to the axis of the screen section 110A-B. Preferably, spaced wraps of profiled wire 112 form the slots of the screens 110A-B, although the screens 110A-B can also be a solid pipe member with slots formed therein.

The central passages 128 in the transition walls 126A-B may be sufficient to control the flow velocity at the screen's surfaces to maintain a preferred surface flow velocity. However, each transition wall 126A-B preferably has a flow modifier 150 disposed in its central opening 128 to further control the flow velocity. In general, the screen intake 100 can use flow modifiers 150 having one or more pipes disposed in the openings 128 and partially inside the hollows of the screen sections 110A-B to communicate fluid from inside the screen sections 110A-B, through the openings 128, and into the hollow 122 of the central body 120.

The screen intake 100 embodied in FIGS. 7A-7B uses single flow pipes 160 for the flow modifier 150 disposed in the openings 128. The screen intake 100 embodied in FIGS. 8A-8B uses double flow pipes 170 and 180 nested inside one another in the openings 128. In both arrangements, the pipes 160 and 170/180 of the flow modifiers 150 can actually be half cylinders with open or closed bottom surfaces, although full cylindrical pipes can be used off center in openings 128 of the transition walls 126A-B.

The screen intake 100 and flow modifiers 150 of FIGS. 7A-7B and 8A-8B are designed to reduce the entrance velocity at the screens' slots to a preferred peak, which may be about 0.135 m/s or 0.5 f/s in some implementations. A lower entrance velocity protects surrounding aquatic life and prevents debris clogging. Designers configure the lengths, diameters, flow areas, and other variables of the flow modifiers' pipes 160 and 170/180 to keep the average flow through the screens' surfaces as close to the allowable peak flow velocity and as uniformly distributed across the screens' surfaces as possible. Where the flow modifier uses two pipes 170/180 as in FIG. 8A, for example, the larger diameter pipe 170 may be about 50% of the screen section 110's diameter and may be about 16% of the length of the screen 110. The smaller diameter pipe 180 nested within the outer pipe 170 may have a diameter about 70% that of the outer pipe 170 and may have a length which extends about 67% of the length of the screen 110. Further details related to the design of the flow modifiers 150 are disclosed in U.S. Pat. No. 6,051,131, which is incorporated herein in its entirety.

As used herein and in the claims, terms such as cylinder and cylindrical are meant to be generic and refer to a general geometric shape known by that name. Terms such as half cylinder and half-cylindrical refer to a division of such a general geometric shape along a longitudinal axis and need not be precisely half. Thus, the sidewall of the cylinder and half cylinder as used herein can be defined by a radius as in the standard geometric shape. However, the sidewall of the cylinder and half cylinder as used herein can be defined by multiple angled surfaces, a cycloidal surface, an elliptical surface, an oval surface, a parabolic surface, or any other curved surface. The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A screen intake apparatus for use in a shallow water source having a current, comprising:
    a platform base for placement on a floor of the shallow water source, the platform base defining a top surface residing above the floor of the shallow water source;
    a body affixed to the top surface of the platform base, the body defining a half-cylindrical hollow having a body axis therein and having an outlet, the outlet having an outlet axis, the body axis being orthogonal to the outlet axis, the body defining an upstream front end facing the current;
    a first curved screen affixed to the top surface of the platform base and defining a first half-cylindrical interior therein, a first end of the first curved screen connected to the body, the first curved screen being arranged upstream the body;
    a second curved screen affixed to the top surface of the platform base and defining a second half-cylindrical interior therein, a first end of the second curved screen connected to the body, the second curved screen being arranged downstream the body;
    a first flow modifier disposed between the first curved screen and the body and placing the first half-cylindrical interior of the first curved screen in fluid communication with the hollow of the body, the first flow modifier having a half-cylindrical shape including a first flow modifier axis, the first flow modifier axis being orthogonal to the outlet axis;
    a second flow modifier disposed between the second curved screen and the body and placing the second half-cylindrical interior of the second curved screen in fluid communication with the hollow of the body, the second flow modifier having a half-cylindrical shape including a second flow modifier axis, the second flow modifier axis being orthogonal to the outlet axis;
    one or more first nested flow modifiers disposed between the first flow modifier and the body, the one or more first nested flow modifiers including a first nested flow modifier axis, the first flow modifier axis being orthogonal to the outlet axis;
    one or more second nested flow modifiers disposed between the second flow modifier and the body, the one or more second nested flow modifiers including a second nested flow modifier axis, the second flow modifier axis being orthogonal to the outlet axis; and
    a profiled barrier for dividing the current at the upstream front end before the current flows past and into contact with the first screen and second screen.

2. The apparatus of claim 1, wherein the first curved screen comprises a half-cylindrical screen sidewall, an open proximal end at the first end, and a closed distal end at a second end, the open proximal end connected to the body and placing the first interior in fluid communication with the a half-cylindrical hollow.

3. The apparatus of claim 2, wherein the closed distal end comprises an end wall defining a half circle.

4. The apparatus of claim 1, wherein the first flow modifier comprises:
   a transition wall disposed between the first half-cylindrical interior of the first curved screen and the a half-cylindrical hollow of the body; and
   at least one first flow passage disposed in the transition wall and placing the first half-cylindrical interior of the first curved screen in fluid communication with the half-cylindrical hollow of the body.

5. The apparatus of claim 1, further comprising a manifold disposed in the first curved screen for receiving a supply of air.

6. The apparatus of claim 1, wherein the first curved screen comprises:
   a plurality of ribs disposed along a length of the first curved screen; and a plurality of wires disposed across the ribs.

7. The apparatus of claim 1, wherein the body comprises a half cylinder mounted on the top surface.

8. A screen intake apparatus for a shallow water source having a current, comprising:
   a base resting on the floor of the water source and having a top surface;
   a body mounted on the top surface of the base, the body defining a half-cylindrical hollow having a body axis therein and having an outlet, the outlet having an longitudinal axis substantially parallel to the top surface of the base, the longitudinal axis of the outlet also being orthogonal to the body axis, the body defining an upstream end facing the current;
   a first curved screen affixed to the top surface of the platform base and defining a first half-cylindrical interior therein, a first end of the first curved screen connected to the body, the first curved screen being arranged upstream the body;
   at least one first curved screen mounted on the top surface of the base and defining a first half-cylindrical interior therein, a first end of the at least one first curved screen connected to the body, the at least one first curved screen being arranged upstream the body and placing the interior of the at least one first curved screen in fluid communication with the hollow of the body;
   at least one second curved screen mounted on the top surface of the base and defining a second half-cylindrical interior therein, a first end of the at least one second curved screen connected to the body, the at least one second curved screen being arranged downstream the body and placing the interior of the at least one second curved screen in fluid communication with the hollow of the body;
   a first flow modifier disposed between the at least one first curved screen and the body, the first flow modifier having a half-cylindrical shape including a first flow modifier axis, the first flow modifier axis being orthogonal to the longitudinal axis of the outlet;
   a second flow modifier disposed between the at least one second curved screen and the body, the second flow modifier having a half-cylindrical shape including a second flow modifier axis, the second flow modifier axis being orthogonal to the longitudinal axis of the outlet;
   one or more first nested flow modifiers disposed between the first flow modifier and the body, the one or more first nested flow modifiers including a first nested flow modifier axis, the first flow modifier axis being orthogonal to the longitudinal axis of the outlet;
   one or more second nested flow modifiers disposed between the second flow modifier and the body, the one or more second nested flow modifiers including a second nested flow modifier axis, the second flow modifier axis being orthogonal to the longitudinal axis of the outlet; and
   a profiled barrier for dividing the current at the upstream front end before the current flows past and into contact with the at least one first curved screen and the at least one second curved screen.

9. The apparatus of claim 8, wherein the at least one first curved screen comprises a half cylinder screen sidewall, an open proximal end for the first end, and a closed distal end for a second end, the open proximal end connected to the body.

10. The apparatus of claim 9, wherein the closed distal end comprises an end wall defining a half circle.

11. The apparatus of claim 9, further comprising:
   a transition wall disposed between the half-cylindrical hollow of the body and the half-cylindrical interior of the at least one first curved screen; and
   the first flow modifier disposed in the transition wall and placing the interior of the at least one first curved screen in fluid communication with the half-cylindrical hollow of the body.

12. The apparatus of claim 8, wherein the base comprises a concrete slab resting on the floor of the water source and having the body and the at least one first curved screen mounted thereon.

13. The apparatus of claim 8, wherein a plurality of anchors affix edges of the body and the at least one first and second curved screens to the base.

14. The apparatus of claim 8, wherein the at least one first curved screen comprises a cylindrical screen partially embedded in the base.

15. The apparatus of claim 8, wherein the base comprises a barrier disposed at one end thereof in a flow path of the water source.

16. The apparatus of claim 8, wherein the barrier extends to a height of the body disposed on the base.

17. The apparatus of claim 8, further comprising a manifold disposed in the at least one curved first screen for receiving a supply of air.

18. The apparatus of claim 8, wherein the at least one first curved screen comprises:
   a plurality of ribs disposed along a length of the at least one first curved screen; and a plurality of wires disposed across the ribs.

19. The apparatus of claim 8, wherein the body comprises a half cylinder mounted on the top surface of the base.

* * * * *